United States Patent [19]
Bartels

[11] Patent Number: 6,029,423
[45] Date of Patent: Feb. 29, 2000

[54] PROCESS AND APPARATUS FOR SYNTHETIC PACKAGING

[75] Inventor: Willy Bartels, Mönchengladbach, Germany

[73] Assignee: FAS Converting Machinery AB, Sweden

[21] Appl. No.: 09/011,037

[22] PCT Filed: Aug. 29, 1996

[86] PCT No.: PCT/SE96/01064

§ 371 Date: Feb. 6, 1998

§ 102(e) Date: Feb. 6, 1998

[87] PCT Pub. No.: WO97/08053

PCT Pub. Date: Mar. 6, 1997

[30] Foreign Application Priority Data

Aug. 29, 1995 [DE] Germany .......................... 195 31 717

[51] Int. Cl.[7] .................................................. B65B 53/02
[52] U.S. Cl. .............................. 53/442; 53/557; 53/370.9; 53/372.3
[58] Field of Search .......................... 53/442, 557, 370.9, 53/372.3, 387.4, 370.8

[56] References Cited

U.S. PATENT DOCUMENTS

| | | |
|---|---|---|
| 2,097,515 | 11/1937 | Chambless .......................... 53/370.9 X |
| 4,901,506 | 2/1990 | Weyandt . |
| 5,179,819 | 1/1993 | Sukeyasu et al. .......................... 53/442 |
| 5,237,796 | 8/1993 | Bonkowski ............................ 53/442 X |
| 5,544,470 | 8/1996 | Yarbrough ................................. 53/442 |
| 5,596,866 | 1/1997 | Martin-Cocher et al. ................. 53/442 |

FOREIGN PATENT DOCUMENTS

| | | |
|---|---|---|
| 0499954A1 | 8/1992 | European Pat. Off. . |
| 1778422 | 10/1971 | German Dem. Rep. . |
| 872400 | 11/1951 | Germany . |
| 182676 | 2/1963 | Sweden . |
| 895696 | 5/1962 | United Kingdom . |
| 2140765 | 12/1984 | United Kingdom ..................... 53/557 |
| WO 84/03872 | 10/1984 | WIPO . |

*Primary Examiner*—Linda Johnson
*Attorney, Agent, or Firm*—Smith, Gambrell & Russell

[57] ABSTRACT

In order to improve a process for producing plastic packaging, particularly using plastic sheets, lateral sections (14) projecting beyond goods to be packaged being at least partly shrunk by heat supply, so that heat-sensitive goods also can be packaged in an economical and visually attractive way, it is proposed that the heat supply be interrupted as soon as the shrinking process starts in an area of plastic packaging subjected to heat, and that mechanical pressure be exerted on the heated areas of plastic immediately afterwards. An apparatus for carrying out the process for producing plastic packaging has an uptake area, a heat supply device and pressure members (15).

16 Claims, 1 Drawing Sheet

FIG 1
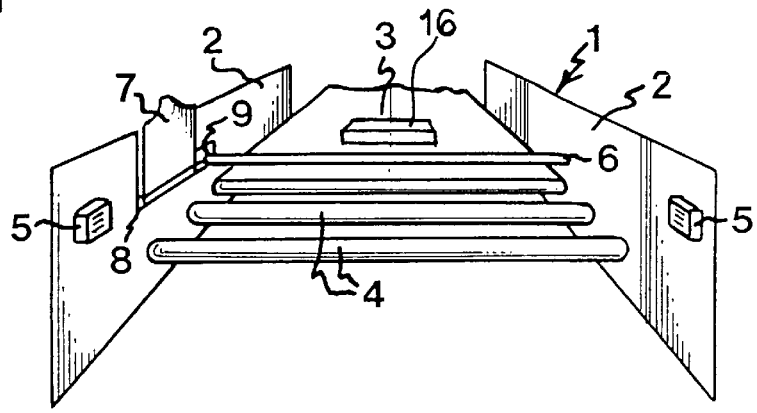
FIG 2
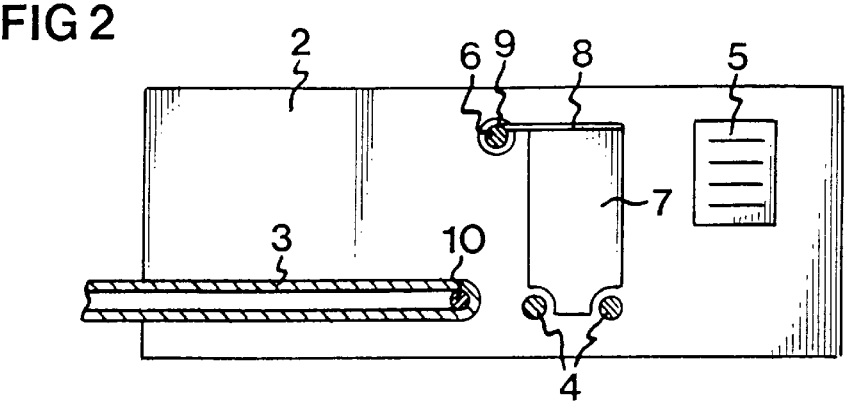
FIG 3a 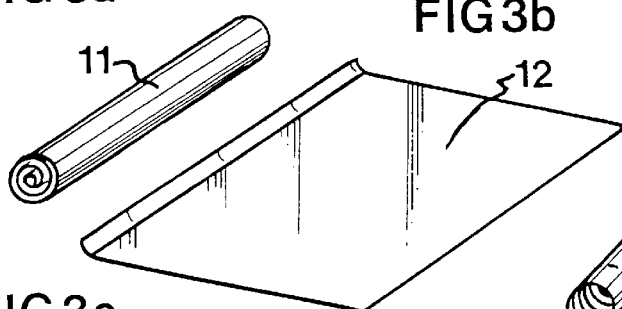 FIG 3b 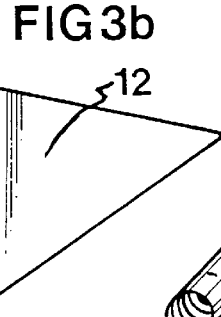 FIG 3c FIG 3d 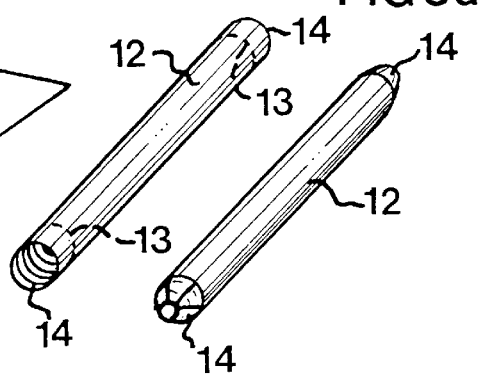
FIG 3e 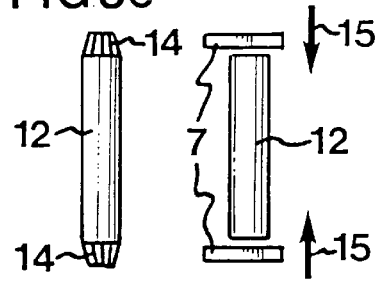 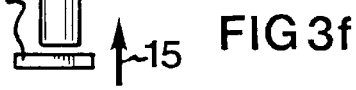 FIG 3f

PROCESS AND APPARATUS FOR SYNTHETIC PACKAGING

The present invention concerns a process for producing synthetic packaging, in particular by using sheets made of synthetic material, synthetic material projecting in areas of lateral edges of the goods to be packaged being heat-shrunk by means of heat supply. Further, the present invention concerns an apparatus for carrying out a process for producing plastic packaging.

Examples of methods and apparatus reflecting background art are disclosed in, inter alia, WO 84/03872 and DE-A-1 778 422.

Shrink synthetic packaging and processes for producing such shrink synthetic packaging are known in the state of the art. Sheets to be shrunk, using heat supply, around goods to be packaged, are placed around these goods or bundles and are shrunk in projecting lateral areas, which results in tight packaging. For this, only specific shrink sheets are used. A disadvantage of the known process is that the packaging is not suitable for all goods, especially not for heat-sensitive goods which deteriorate because of heat supply or, because of their sensitivity to heat, undergo a change in texture, melting or the like. Moreover, shrink packaging is not suitable for packaging having a large surface and produces a packaging edge which cannot be visually reproduced. The sheets shrink in an uncontrolled manner in areas which have heat applied to them, and partly produce very unpresentable edge areas. Finally, all known shrink-sheet packaging processes are not always economically applicable because of the time needed for complete shrinking.

Futhermore, it is known for sensitive goods also to be packaged in synthetic sheets which are stuck together.

Based on this state of the art, the present invention is aimed at improving a process for producing synthetic packaging of this type, which can be used on heat-sensitive goods and which can be used on extensive packaging areas, while producing a visually attractive and partly reproducible packaging edge.

This aim is achieved by the process and apparatus according to the appended claims. To achieve this aim, it is proposed by the present invention that heat supply be interrupted as soon as a shrinking process begins in a given area of synthetic packaging subjected to heat and that mechanical pressure be applied to heated areas of synthetic packaging immediately afterwards.

Using a process in accordance with the present invention, corresponding areas of synthetic packaging are not subjected to heat until they are fully shrunk, instead only until shrinking has just begun. This moment is not to be exactly mathematically recorded, instead it is a moment at which parts of the synthetic packaging begin to shrink while other parts have become soft because of the heat supplied. At this moment, mechanical pressure is exerted on the heated areas so that the parts melted or softened by heat supply join together in a flat form. A packaging edge produce in this way offers, in terms of packaging, sufficient mechanical holding, without as much heat needing to be supplied as may adversely affect heat-sensitive goods.

The present invention enables the use of synthetic packaging in general, which does not necessarily have to involve particular shrink sheets of a conventional type. A process in accordance with the present invention can also be used on heat-sensitive goods, as these are not subjected to heat.

An important field of use is the packaging of plastic items. It is known, for example, for plastic waste bags, in a rolled-up form, used also for congealing and frozen materials and the like, to be sold packaged such that the bundle rolls cannot be unrolled. For marketing reasons, it is desirable to use, for example, presentably printed plastic sheets to package such bundles. If conventional shrink sheets should be shrunk on in the lateral areas by a corresponding heat supply, bags in such bundles would simultaneously also be melted, whereby these would acquire at least an unattractive exterior. Such bundles can be packaged, in a visually attractive form, in plastic sheets, using a process in accordance with the present invention, also without the use of particular shrink sheets. This naturally also applies to other heat-sensitive items, whether they be plastic, paper, foodstuffs or the like.

According to a favourable aspect of the present invention, control of interruption of the heat supply and exertion of mechanical pressure is carried out dependent on time. Depending on the goods to be packaged and the synthetic material used to make the packaging, a given moment for interrupting the heat supply and application of mechanical pressure can easily be empirically recorded.

Alternatively, or additionally, it is possible to apply heat to a control sheet aligned parallel to a bundle to be packaged and to determine the right moment for interruption of the heat supply by means of optical or temperature sensors.

In one aspect of the present invention, the heat supply is effected by supplying hot air. This confers the advantage that the heat is targeted and can be supplied exactly in terms of time as, when the hot-air supply is interrupted, there is automatically an immediate interruption of heat supply.

In an advantageous aspect of the present invention, the application of mechanical pressure occurs in the direction of the goods to be packaged. The heated areas are thereby pressurised in the direction of the goods to be packaged and adhere or melt there, which results in a straight, flat synthetic surface having a good mechanical consistency and lying on the packaged product.

In a favourable way, flat pressure devices are used to exert mechanical pressure. In a further favourable aspect of the present invention, the pressure devices can be cooled during or immediately after application of mechanical pressure. Supply of cool air is favourably suitable for this.

Polypropylene material is, for example, an alternative to other known shrink sheets, as synthetic material for producing plastic packaging.

The process according to the present invention enables, in a simple and economic way, production of visually attractive plastic packaging, in particular also for heat-sensitive goods.

According to the present invention, an apparatus for carrying out the inventive process is also specified, which, in its main structure, has an uptake area for a product to be packaged wrapped in a plastic sheet, a heat-supply device directed to relevant areas, and pressure members for exerting mechanical pressure on corresponding areas of the product to be packaged. The heat-supply device favourably comprises hot-air blowers. The pressure members are, in a favourable aspect of the present invention, pressure plates, which can pivot advantageously in the direction of the product to be packaged. Consequently, mechanical pressure can be exerted on relevant areas by means of the apparatus concerned after the supply of hot air, such that said pressure plates are pivoted onto the product to be packaged and thereby compress the areas of heated plastic. The apparatus moreover has a cooling device for said pressure plates, advantageously a cool-air blower.

According to the present invention, a process and an apparatus are proposed, which enable economical packaging also of heat-sensitive goods in a visually attractive form by means of shrinkage of synthetic wrapping materials.

Further advantages and characteristic features of the present invention are illustrated by the following description, with reference to the accompanying drawings, in which:

FIG. 1 is a schematic, perspective view of an embodiment of a packaging apparatus;

FIG. 2 is a partly sectioned view of an apparatus in FIG. 1, and

FIGS. 3a–3f are schematic views of an embodiment of a packaging process.

A packaging apparatus shown schematically in FIGS. 1 and 2 is disposed in a housing which, for reasons of simplification, is shown by two side walls 2. These side walls 2 serve to house shafts and rollers, for example, a return roller 10 for a feed band 3. The feed band 3 can be combined, in a known way, with conventional rolling-up devices, in order to wrap goods in a surrounding package. The wrapped packaged goods can be moved forward on rollers 4 by means of the feed band 3, where the product wrapped in plastic packaging material is briefly held. At specific points, the packaging material is subjected to hot-air supplied by hot air blowers 5. A controlling means which is not shown provides for interruption of the hot-air supply at a suitable moment. Pressure plates 7 are disposed to be able to pivot on a cross-piece 6, for example by means of a rotating cylinder. For reasons of clarity, only one pressure plate 7 is shown in FIG. 1, nevertheless the packaging apparatus 1 concerned is symmetrically designed. The pressure plate 7 can be pivoted about an axis 8 to an upper position shown in FIG. 1 or to a lower position as shown in FIG. 2. The pressure plate 7 is designed on its free edge, such that it can be pivoted between rollers 4. In order to make the position of the pressure plate 7 and its pivoting axis 8 variable, the rotating cylinder 9 can be released, such that the pressure plate 7 can be shifted on the cross-piece 6.

The packaging process is illustrated in FIGS. 3a–3f. For example, a roll of bags 11 is shown in FIG. 3a. This comprises rolled-up plastic bags which are to be sold for holding waste material. A packaging sheet 12 is shown in FIG. 3b. The roll of plastic bags 11 is wrapped in this packaging sheet 12, which results in the bundle as shown in FIG. 3c. The rim of the roll of bags is indicated by a dashed line 13, whereby the packaging sheet 12 develops projecting material 14 on both sides. Hot air is targeted on these projecting sides 14, such that a softening or shrinking process is started. Then the state as shown in FIGS. 3d and 3e arises, in which the projecting side material is softened, as a result of being subjected to heat, and begins to shrink. At this moment, as shown in FIG. 3f, pressure is exerted on said side material by means of pressure plates 7, in the direction of an arrow 15, which results in a flat, orderly packaging lateral edge. Through cooling of the pressure plates 7, the transmitted heat can be removed and the cooling of said packaging lateral edge can be accelerated. A cooling device 16 can be disposed, for example, above the cross-piece 6, such that cool air is directed onto the pressure plates 7 pivoted upwards.

The embodiments illustrated in the accompanying drawings are shown only by way of illustration and are not limiting.

I claim:

1. Process for producing plastic packaging, comprising:

covering goods to be packaged with a sheet of synthetic material, such that sections of side areas of the synthetic material project beyond the goods to be packaged at two opposite sides of the goods to be packaged, supplying heat to each section until the section is at least partly shrunk by the supplied heat, interrupting the heat supply as soon as the heated section begins to shrink in areas subjected to heat, and immediately afterwards exerting mechanical pressure on the areas of the heated section subjected to heat.

2. Process in accordance with claim 1, wherein interruption of the heat supply and exertion of the mechanical pressure are controlled dependent upon time.

3. Process in accordance with claim 1, wherein a time for interruption of the heat supply and exertion of the mechanical pressure is determined by subjecting a reference control sheet to heat and measuring a response of the reference control sheet.

4. Process in accordance with claim 1, wherein temperature sensors are used to determine a time for interruption of the heat supply and exertion of the mechanical pressure.

5. Process in accordance with claim 1, wherein hot air is used to supply heat.

6. Process in accordance with claim 1, wherein the mechanical pressure is exerted in a direction toward the goods to be packaged.

7. Process in accordance with claim 1, wherein substantially flat pressure devices are used to exert the mechanical pressure.

8. Process in accordance with claim 7, wherein said pressure devices are cooled.

9. Process in accordance with claim 8, wherein cool air is used to cool said pressure devices.

10. Process in accordance with claim 1, wherein the synthetic material is polypropylene.

11. Apparatus for producing plastic packaging, comprising:

an uptake area for holding a product packed in synthetic material to be packaged, a heat-supply device for supplying heat to each section of the synthetic material that projects beyond one of two opposite sides of the product to be packaged and for interrupting the supplied heat when the heated section begins to shrink in areas subjected to the supplied heat, and pressure members for exerting mechanical pressure on the heated section of the synthetic material immediately after the supplied heat is interrupted.

12. Apparatus in accordance with claim 11, wherein said heat-supply device includes hot air blowers.

13. Apparatus in accordance with claim 11, wherein said pressure members are formed of pressure plates.

14. Apparatus in accordance with claim 13, wherein said pressure plates are pivotable.

15. Apparatus in accordance with claim 11, wherein a cooling device is employed to cool said pressure members.

16. Apparatus in accordance with claim 15, wherein said cooling device includes a cool air blower.

* * * * *